United States Patent [19]

Iuchi et al.

[11] 4,319,622
[45] Mar. 16, 1982

[54] PNEUMATIC TIRE WITH IMPROVED BEAD CONSTRUCTION

[75] Inventors: Munenori Iuchi; Tsutomu Iseki; Yoshinori Takeyama; Masuhiro Ohira, all of Shirakawa, Japan

[73] Assignee: Sumitomo Rubber Industries, Ltd., Hyogo, Japan

[21] Appl. No.: 179,013

[22] Filed: Aug. 18, 1980

Related U.S. Application Data

[63] Continuation of Ser. No. 918,035, Jun. 22, 1978, abandoned.

[30] Foreign Application Priority Data

Jun. 29, 1977 [JP] Japan .................................. 52/78314

[51] Int. Cl.³ ............................................ B60C 15/04
[52] U.S. Cl. ................................. 152/362 R; 245/1.5
[58] Field of Search ...... 152/362 R, 362 CS, DIG. 9; 152/391; 245/1.5

[56] References Cited

U.S. PATENT DOCUMENTS

| | | | |
|---|---|---|---|
| 3,777,799 | 12/1973 | Montagne | 152/362 R |
| 4,029,137 | 6/1977 | Suydam | 152/362 R |
| 4,085,787 | 4/1978 | Maiocchi | 152/362 R |

FOREIGN PATENT DOCUMENTS 955570  8/1976  Canada ............................. 152/362 R Primary Examiner—John E. Kittle
Assistant Examiner—Lois E. Boland
Attorney, Agent, or Firm—Birch, Stewart, Kolasch and Birch

[57] ABSTRACT

A pneumatic tire having an improved bead construction in which each of the bead cores which is composed of a number of layers of bead wires piled up one upon another to have a hexagonal cross section, whose one side is approximately parallel to a bead base portion, has at least more than one layer of bead wires further piled up on the top of the number of layers at a side opposite to the one side of the hexagonal cross section to fill up a gap or clearance between the side opposite to said one side of the hexagonal cross section and a bias-ply carcass turned up around the bead cores.

8 Claims, 4 Drawing Figures

PNEUMATIC TIRE WITH IMPROVED BEAD CONSTRUCTION

This application is a continuation, of copending application Ser. No. 918,035, filed on June 22, 1978, now abandoned.

BACKGROUND OF THE INVENTION

The present invention relates to a pneumatic tire and more particularly, to an improved bead construction for a pneumatic tubeless tire, particularly employing a bias-ply carcass of steel cord.

Commonly, there are two types of pneumatic tires, i.e., those using inner tubes and the tubeless type which does not use inner tubes. In the latter tubeless type which is widely applied to recent motor vehicles, the tire is mounted on a wheel rim in such a manner that air is retained between the rim and tire casing and the tire bead is so constructed that it seals tightly against the rim flange to retain air pressure when the tire is inflated.

In FIG. 1 showing a construction of a conventional pneumatic tubeless tire as described above, the tire or tire cover 1 made of rubber or similar material generally includes a tread portion 1t, a pair of opposed side wall portions 1d contiguous to both sides of the tread portion 1t, and pair of bead portions 2 in which bead cores 3A are respectively embedded.

The tire cover 1 further includes a bias-ply carcass portion 4 facing a pneumatic chamber 1p defined in the tire cover 1 and composed, for example, of at least two layers of steel cord adjoining each other, and an inner layer 8 of rubber material further deposited on the bias-ply carcass portion 4 in a known manner. The carcass portion 4 extends between the bead portions 2 with opposite ends thereof inwardly turned up or folded back around the respective bead cores 3A and secured in positions within the bead portions 2. Thus a substantially intermediate portion of the carcass portion 4 is provided which extends immediately below the tread portion 1t.

More specifically in FIG. 2, each of the bead portions 2 includes a base portion 2a which is inclined at an angle $\theta$ of approximately 15° with respect to a line c parallel to an axial line of a wheel (not shown), and the bead core 3A formed by a bundle of bead steel wires and a suitable filling member to have an approximately hexagonal cross section and embedded in the bead portion 2 in such a manner that one lower side 3Aa of the hexagonal cross section is approximately parallel to the base portion 2a, while an end ply edge 4a of the carcass portion 4 is turned up around the periphery of the bead core 3A, with a filler 7, for example, of steel cord being further applied onto such a turned up portion of the carcass 4 as shown. Upon fitting of the base portion 2a of the bead portion 2 onto a tire seat portion 5 of a wheel rim 6 having the same inclination of the angle $\theta$ as that of the base portion 2a, the driving force of the wheel (not shown) is transmitted to the tire 1 through frictional force between the base portion 2a of the bead portion 2 and the tire seat portion 5 of the wheel rim 6.

In the known arrangement as described above, during the use of the tire 1, the carcass portion 4 and filler 7 are pulled or subjected to tension in the directions shown by the arrows due to internal air pressure P applied onto the inner surface of the tire 1 upon inflation of said tire 1, and the steel cord portions of the carcass 4 and filler 7 tend to be separated from the rubber material of the tire 1 particularly in the vicinity of the end ply edge 4a of the carcass 4 and an edge 7a of the filler 7, with the base portion 2a of the bead portion 2 being consequently deformed as shown by a chain line in FIG. 2. The tire 1 whose bead base portions 2a are deformed as described above is extremely difficult to seal against the internal air pressure P, during re-mounting thereof onto the wheel rim 6 after once detached from said rim 6, and if the deformation is excessive, there are cases where slipping takes place between the wheel rim 6 and the tire 1. Accordingly, in order to reduce the influence by the above described pulling due to the internal air pressure P over the end edge 4a of the carcass portion 4 and the edge 7a of the filler 7 as far as possible, and also to minimize the deformation of the bead base portion 2a, it is advantageous to decrease the internal diameter relating to the of the bead core 3A i.e., the internal diameter of the bead cord ring and simultaneously to arrange the particular lower side 3Aa of the hexagonal cross section of the bead core 3A as wide as practicable.

On the other hand, during the vulcanization and molding in the manufacture of the tire 1 in a known manner, the external diameter of a raw tire (not shown) before such vulcanization and molding is made smaller than the inner diameter of the tire mold (not shown) by 2 to 5% so as to be expanded to a corresponding extent by the internal air pressure P before the vulcanization to achieve a close contact between the tire mold and the raw tire for proper molding, and in the above case, the bias-ply carcass portion 4 is also pulled by approximately 5 mm in the direction of the arrow in FIG. 2, with consequent lowering in the position of the end edge 4a of the carcass portion 4 by a corresponding extent. If such movement of the carcass portion 4 is not smoothly effected during the manufacture of the tire 1, not only the position of the end ply edge 4a is not maintained uniform throughout the tire on the whole, but the inner layer 8 to be formed on the bias-ply carcass portion 4 tends to pass through the carcass portion 4 into the rubber material of the tire cover 1 toward the other side of such carcass portion 4, with a possibility that the carcass portion 4 is exposed to the inner side of the tire 1 in extreme cases. Therefore, for causing the carcass portion 4 to be slipped or displaced smoothly around the bead core 3A during the manufacture of the tire 1, it is preferable that the bead core 3A has a cross section close to a circular shape.

As is seen from the foregoing description, conditions contrary to each other are required during the use and in the manufacture of the tire 1.

For satisfying such requirements as described above, there may be employed, during the molding of the raw tire, a composite bead core 11 preliminarily prepared by applying a filling rubber member 9 of arcuate cross section onto the upper portion of the bead core 3A and lapping a rubber coated fabric 10 and the like around the core 3A after application of zinc stearate, etc. having mold releasing effect onto said core 3A, so that the carcass portion 4 is caused to slip in close contact around the outer periphery of the rubber coated fabric 10 for smooth displacement of said carcass portion 4 in the direction of the arrow in FIG. 2. The known arrangement as described above, however, has such a disadvantage that a considerable time or man-hour is required for the application of the filling rubber member 9, thus resulting in high cost in the manufacture of the tire. Alternatively, as shown in FIG. 3, there may be employed a bead core 3B having a rubber layer 12 preliminarily molded therearound, for example, by press work and the like, with the one lower edge 3B*a* of the hexagonal cross section being arranged approximately in parallel with the base portion 2*a* for use during the molding of the raw tire. However, such an arrangement also requires extra man-hours for the formation of the rubber layer 12 around the bead core 3B by pressing, with a consequent increase in cost.

SUMMARY OF THE INVENTION

Accordingly, an essential object of the present invention is to provide an improved bead construction of a pneumatic tire in which undesirable influence due to pulling of bias-ply carcass portion and deformation of bead portions during the use of the tire is minimized, while smooth and uniform displacement of the carcass portion around bead cores is achieved during the manufacture of the tire.

Another important object of the present invention is to provide an improved bead construction of a pneumatic tire as described above which is simple in structure and reliable in functioning for making it possible to produce the tire in an efficient manner at low cost.

In accomplishing these and other objects, according to one preferred embodiment of the present invention, the pneumatic tubeless tire includes a tire cover made of a rubber material and having a tread portion, a pair of opposed side walls integrally extending from respective side edges of the tread portion, a pair of opposed bead portions integrally extending from respective free ends of the individual side walls and each having a bead base portion to be fitted onto a wheel rim, bead cores respectively embedded in the bead portions and each composed of a number of layers of bead wires piled up one layer upon another to have a hexagonal cross section so that one side of the hexagonal cross section at a lowest layer of said number of layers is approximately parallel to the bead base portion, and a carcass structure embedded in the tire cover adjacent to the inner surface thereof and arranged to be turned up, at opposite ends thereof, around the bead cores. The number of layers of bead wires formed into the hexagonal cross section have at least more than one layer of bead wires further piled up on the top of said number of layers at a side opposite to said one side of the hexagonal cross section for filling up a gap or clearance between said side opposite to said one side of said hexagonal cross section and said carcass structure.

By the improved bead construction as described above, the adverse effect due to the pulling of the bias-ply carcass portion and deformation of the bead portions during use of the tire is minimized, while the desirable smooth and uniform displacement of the carcass portion around the bead cores is advantageously achieved in the production of the tire.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 4:
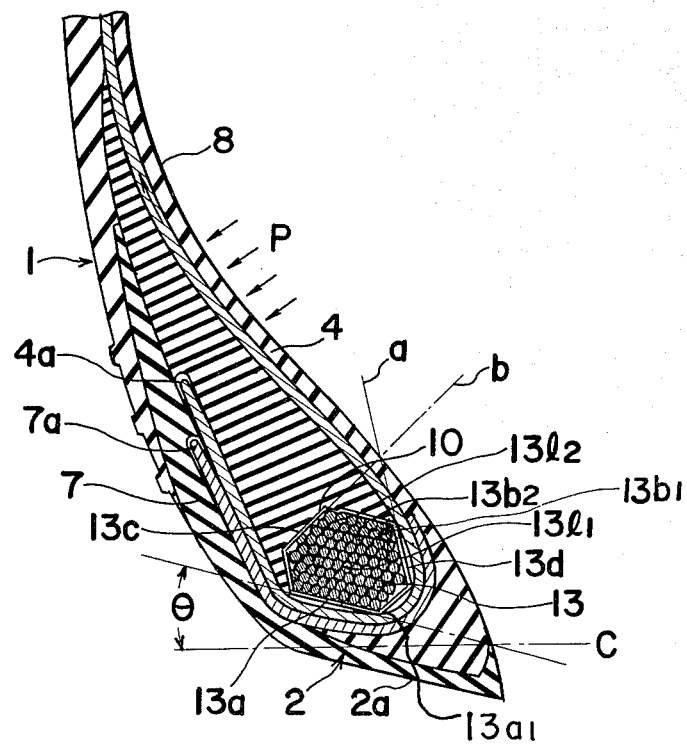
FIG. 4 is a fragmentary sectional view, on a still enlarged scale, showing a structure of a bead portion of a pneumatic tire in which the improved bead construction according to one preferred embodiment of the present invention is incorporated.

Referring now to FIG. 4, there is shown an improved bead construction of a pneumatic tubeless tire according to the present invention.

Figure 1:
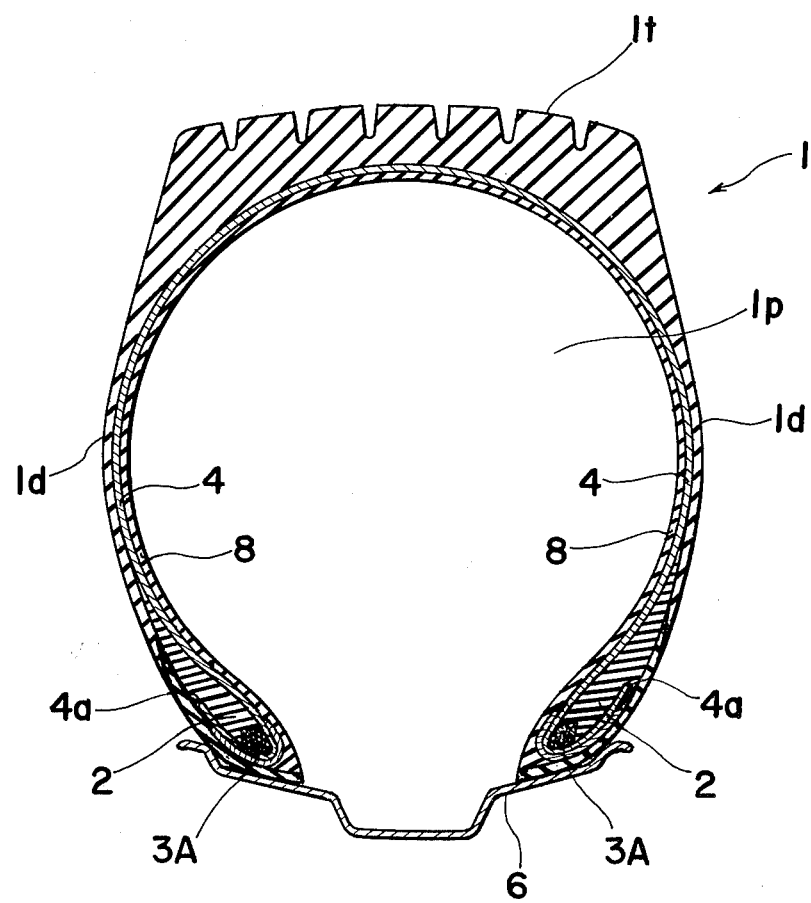
FIG. 1 is a schematic sectional view of a conventional pneumatic tire already referred to and to which an improved bead construction according to the present invention may be applied.

In the bead construction of FIG. 4, each of the bead portions 2 is provided with the base portion 2*a* which is inclined at the angle $\theta$ of approximately 15° with respect to the line c parallel to the axial line of a vehicle wheel (not shown), and the bead core 13 formed by layers of bead steel wires in the manner described in detail later and surrounded by the rubber coated fabric 10 to form an approximately equilateral or regular hexagonal cross section and embedded in the bead portion 2 in such a manner that one lower side 13*a* of the hexagonal cross section is approximately parallel to the base portion 2*a* of the bead portion 2, while the ply edge 4*a* of the bias-ply carcass 4, for example, of steel cord material is turned up or folded back around the periphery of the bead core 13*a*, with the filler 7, for example, also of steel cord material further applied onto such turned up portion of the bias-ply carcass 4 in the similar manner as in the conventional arrangements in FIGS. 1 to 3.

It should be noted here that in the arrangement of the present invention as described above, the internal diameter relating to the lower side 13*a*, as measured from point 13*a* to the center of the tire of the bead core 13 is made as small as possible, while the lower side 13*a* of the hexagonal cross section is set to be as wide as practicable for reduction of the adverse effect by the pulling due to the internal air pressure P to the edge 4*a* of the bias-ply carcass 4 and the edge 7*a* of the filler 7 and also for minimizing the deformation of the bead base portion 2*a* during the use of the tire.

Figure 2:
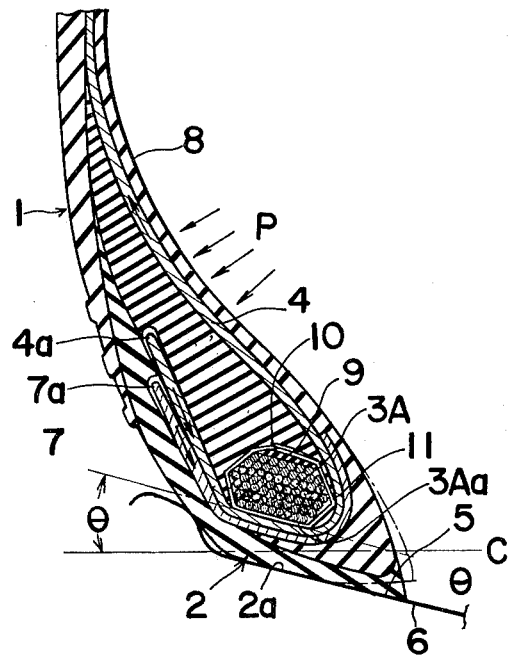
FIG. 2 is a fragmentary sectional view, on an enlarged scale, showing a structure of a bead portion of a pneumatic tire of FIG. 1.

It should also be noted that the bead core 13 described to be of approximately equilateral hexagonal cross section in the foregoing embodiment need not necessarily be limited to be of such a hexagonal cross section, but may be modified to any other approximately equilateral polygonal cross sections including more than six sides close to a perfect circle or to a semi-circular cross section so far as the smooth slippage of the carcass portion around the bead core 13 is achieved to overcome the inconveniences in the manufacture of the tire as described with reference to FIG. 2.

Figure 3:
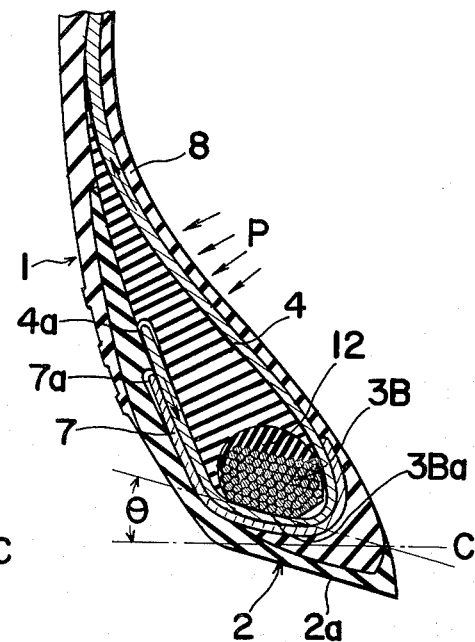
FIG. 3 is a similar view to FIG. 2, but particularly shows a modified structure thereof.

Meanwhile, layers 13$l_1$ of steel wires which form the bead core 13 surrounded by the rubber coated fabric 10 are composed, for example, of rows of nine, ten, eleven, twelve, eleven, ten and nine turns of steel bead wires piled up one row upon another from the bottom side 13*a* of the hexagonal cross section having the sufficient width, while the filling rubber member 9 or rubber layer 12 described as employed in the conventional arrangement in FIG. 2 or 3 is replaced by layers $13l_2$ composed, for example, of rows of eight and seven turns of bead wires further piled up on the uppermost layer of the layers $13l_1$ at a side $13b_1$ opposite to the bottom side $13a$ of the hexagonal cross section and occupying a space defined by a side $13b_2$ facing the particular side $13b_1$ of the hexagonal cross section and by lines a and b extended from sides $13c$ and $13d$ neighboring said side $13b_1$ for filling the gap or clearance with respect to the turned up portions of the carcass portion 4 around the bead core 13.

More specifically, in the bead construction of the polygonal cross section according to the present invention as described above, on the assumption that N, M and L represent positive integral numbers, the rows of bead wires for the layers $13l_1$ and $13l_2$ are piled up from the bottom side of the polygonal cross section in such an order as N, N+1, N+2, . . . , N+M, N+(M−1), N+(M−2), . . . , and N+(M−L) in the number of turns of said bead wires, while the integral numbers N, M and L are set in the ranges as follows.

$$7 \leq N \leq 11$$

$$2 \leq M \leq 4$$

$$(M+1) \leq L \leq (M+4)$$

It should be noted here that, in the uppermost layer, the number of the bead wires may be further reduced from the value given by N+(M−L).

In the bead construction according to the present invention, since the inner diameter relating to the lower side $13a$ of the bead core 13 is small, with the width of the bottom side $13a$ of the bead core 13 being sufficiently large, it is possible to reduce the adverse effect by the pulling of the carcass portion 4 and deformation of the base portion $2a$ during the use of the tire 1, while the desirable uniform slippage of the carcass portion is achieved around the bead core 13 during manufacture of the tire. Furthermore, the bead construction according to the present invention, although extremely simple in its structure, decreases the man-hour required for the manufacturing, with consequent reduction of cost involved. Moreover, according to the improved bead construction of the present invention, the strength of the bead core 13 has been improved to such an extent as can not be expected by the employment of the known filling rubber 9 and the like. For example, according to the experiments carried out by the present inventors on the bead core 13 of FIG. 4, strength increase of approximately 20% has been achieved as compared with the conventional bead core 3 of FIGS. 1 to 3.

As is clear from the foregoing description, according to the present invention, the improved construction of the bead cores can advantageously be introduced into the pneumatic tires, without involving any particular processing devices or extra man-hour, or alteration of existing tire manufacturing arrangements.

It should be noted here that in the foregoing embodiment, although the present invention is mainly described with reference to the pneumatic tubeless tires, the concept of the present invention is not limited in its application to such pneumatic tubeless tires alone, but may readily be applicable within the scope to tires in general, for example, to pneumatic tires with inner tubes, and that the cross sectional configuration of the bead core described as hexagonal in the foregoing embodiment may be modified to any other polygonal shapes within the scope.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A pneumatic tubless tire for use on a motor vehicle which comprises a tire cover made of a rubber material and having a tread portion, a pair of opposed side walls extending integrally from respective side edges of the tread portion, a pair of opposed bead portions extending integrally from respective free ends of the individual side walls and each having a bead base portion to be fitted onto a wheel rim, bead cores respectively embedded in the bead portions, each bead core composed of a plurality of layers of bead wires, each layer being constituted by turns of bead wires, piled up one layer upon another to form said bead cores having polygonal cross sections, one side of said polygonal cross section at the lowest layer of the plurality of layers being substantially parallel to the bead base portion, and a carcass embedded in the tire cover adjacent to the inner surface thereof and turned up at opposite ends thereof, around the bead cores, the number of layers of bead wire and the number of turns of bead wire in each layer, from the lowest layer thereof, being arranged in the order of N,N+1,N+2, . . . ,N+M,N+(M−1),N+(M−2), . . . , and N+(M−L)

wherein the integral numbers N, M and L are set within the following ranges:

$$7 \leq N \leq 11$$

$$2 \leq M \leq 4$$

$$(M+1) \leq L \leq (M+4).$$

2. A pneumatic tire as claimed in claim 1 wherein the polygon is of a hexagonal cross section.

3. A pneumatic tire as claimed in claim 1, wherein said carcass structure is of steel cord material.

4. A pneumatic tire as claimed in claim 1, wherein said bead wire for said bead core is made of steel cord material.

5. A pneumatic tire as claimed in claim 1, wherein an internal diameter of said bead core is made as small as possible.

6. A pneumatic tire as claimed in claim 1, wherein said bead core is made, in its polygonal cross section, having a substantially circular shape.

7. A pneumatic tire as claimed in claim 1 wherein said bead core is made as wide as possible at said one side of its polygonal cross-section which is substantially parallel to said bead base portion.

8. A pneumatic tubeless tire for use on a motor vehicle which comprises a tire cover made of a rubber material and having a tread portion, a pair of opposed side walls integrally extending from respective side edges of the tread portion, a pair of opposed bead portions extending integrally from respective free ends of the individual side walls and each having a bead base portion to be fitted onto a wheel rim, bead cores respectively embedded in the bead portion, each bead core composed of a plurality of layers of bead wires, each layer being constituted by turns of bead wire, piled up one layer upon another to form said bead cores to substantially define equilateral polygonal cross sections including more than six sides such that one side of said equilateral polygonal cross section at the lowest layer of said plurality of layers is substantially parallel to said bead base portion, and a bias-ply carcass embedded in the tire cover adjacent to the inner surface thereof and turned up at opposite ends thereof around said bead cores, the number of layers of bead wire and the numbers of turns of bead wire in each layer, from the lowest layer thereof, being arranged in the order of $$N, N+1, N+2, \ldots, N+M, N+(M-1), N+(M-2), \ldots, \text{and } N+(M-L)$$

wherein the integral numbers N, M and L are set within the following ranges:

$7 \leq N \leq 11$ $2 \leq M \leq 4$ $(M+1) \leq L \leq (M+4)$.

* * * * *